United States Patent [19]

McElroy

[11] 3,756,070
[45] Sept. 4, 1973

[54] ULTRASONIC INSPECTION DEVICE

[75] Inventor: Jerry T. McElroy, Boulder, Colo.

[73] Assignee: Automation Industries, Inc., Los Angeles, Calif.

[22] Filed: Oct. 13, 1970

[21] Appl. No.: 80,434

[52] U.S. Cl............. 73/67.8 R, 73/71.5 U, 310/9.5
[51] Int. Cl. ........................................... G01n 29/04
[58] Field of Search...................... 310/8.2, 8.7, 9.5; 73/67.5 R, 67.6, 67.7, 67.8 R, 67.9, 71.5 U

[56] References Cited
UNITED STATES PATENTS
2,803,129  8/1957  Bradfield ............................ 73/67.8
3,591,813  7/1971  Coquin ................................ 310/9.5

OTHER PUBLICATIONS

D. A. Berlincourt, Lithium Niobate for Piezoelectric Applications, Engineering Memorandum No. 67-20, pub. Sept. 26, 1967, Clevite Corporation, Electronic Research Division, Cleveland 8, Ohio.

*Primary Examiner*—Richard C. Queisser
*Assistant Examiner*—John P. Beauchamp
*Attorney*—Dan R. Sadler

[57] ABSTRACT

A nondestructive material tester which is comprised of a search unit of lithium niobate cut normal to the 0° Y axis. The parallel faces normal to the 0° Y axis have electrical energy of ultrasonic frequency applied thereto and receive ultrasonic energy from a test object.

5 Claims, 4 Drawing Figures

Patented Sept. 4, 1973

3,756,070

Jerry T. McElroy,
INVENTOR.
BY.
ATTORNEY.

ULTRASONIC INSPECTION DEVICE

BACKGROUND OF THE INVENTION

1. Field of the Invention

This invention relates to ultrasonic nondestructive testers and more particularly to a novel and improved search unit which is comprised of a plate formed of lithium niobate cut along a plane normal to the 0° Y axis.

2. Discussion of the Prior Art

In the prior art, there is provided electrical nondestructive test equipment which generates ultrasonic vibrations by use of a material such as a crystal transducer. The vibrations from the transducer are sent in the form of an acoustical pulse beam into the workpiece being tested. The beam travels unimpeded through large metallic parts and reflects back from the end surfaces thereof. Any flaw, defect or other discontinuity in the workpiece also causes reflection of the acoustical beam back to the instrument which indicates the location and size of discontinuity on a display such as an oscilloscope. The search unit need only have access to one side of the workpiece being tested. The pulsed high frequency vibration is projected from the search unit into the workpiece. A portion of the pulse is reflected back by the flaw or defect and the balance is reflected from the end surfaces. The return energy is displayed on the oscilloscope as vertical spikes. The screen on the oscilloscope exhibits electrical waveforms in the form of spikes of the initial pulse, the defect, and the back and front surface relfections. Spacing of the spikes on the scope is in proportion to the distance the beam travels in the material tested, thus locating the position of any flaw by irregular spaced spikes.

Also, such a tester is used to determined the thickness of the workpiece by the regularity of the returned back and front surface spikes. If any discrepancy appears in the thickness, it is detected by a relative change in the spikes displayed on the scope.

The heart of an ultrasonic test system as described herein is a method of transforming electrical energy into mechanical vibrations and transforming the mechanical vibrations into electrical energy. This transformation is accomplished by a piezoelectric transducer element comprised of a plate of crystaline material such as quartz, lithium sulfate, or polarized ceramic material such as barium titanate, lead metaniobate and lead zirconate. When the piezoelectric element is fabricated into a search unit, it becomes the eye for the ultrasonic system.

The above-mentioned are the most common transducer materials used in the manufacture of ultrasonic search units, but each has limited capabilities. For example, the principal advantages of quartz crystal elements are the electrical and thermal stability, the insolubility to most liquids, the high mechanical strength, wear resistance and excellent uniformity and resistance to ageing. But the quartz crystals have a limitation in that they have a comparatively low electro-mechanical conversion efficiency.

The principal advantages of the lithium sulfate elements are their ease of obtaining optimum acoustic damping for best resolution, intermediate conversion efficiency, and negligible mode interactions. But a disadvantage of lithium sulfate is that it is restricted to temperatures below 165° F. The polarized ceramics have the high conversion efficiency which yields high search unit sensitivity because of lower mechanical strength and relatively high electro capacitance, however, their use is generally restricted to frequencies below 15 megacycles. Another limitation is some interaction between various modes of vibration.

SUMMARY OF THE INVENTION

It has been found that most of these difficulties have been overcome by using a search unit comprised of lithium niobate, but it has been discovered that only if the material is cut on a 0° Y axis, that is cut with a face normal to the 0°Y axis, it exhibits a slightly larger frequency constant, that is, the thickness of plate required for given frequency, than the prior art lithium sulfate or quartz. This allows an ability to produce higher fundamental operating frequency because the crystal plate is thicker than quartz, lithium sulfate or the ceramics at any given frequency. Thus, with lithium niobate one is able to produce, for example, a 35 Mhz search unit with the possibility of going higher in frequency, and this is a valuable feature of crystaline materials.

Further, it has been discovered that it has a very high curie temperature, that is, it can be operated on hot workpieces even up to the range of 1,000° centigrade.

Further, a feature of the present invention is that it is not water soluble, thus can be exposed directly to water in immergent testing. Whereas lithium sulfate, for example, must be sealed with a facing material which at the higher frequency is very attenuative. The present invention responds well to the same damping and mounting techniques that are presently used for lithium sulfate and lead zirconate but without the undesirable characteristics of these materials.

Further, a feature of the present invention is that it is capable of being cut to higher operating frequency than any of the other crystal materials now in the prior art.

The present invention overcomes the previous difficulties in search unit materials and one which has all of the above-mentioned desirable characteristics. The present invention provides a search unit comprised of a lithium niobate material cut normal to the 0° Y axis. A search unit includes a transducer comprised of a boule, which is the natural crystal growth shape, with a reference cut normal to a 0° Y axis as determined by the X-ray defraction method. A plurality of plates is then cut from a single boule by use of a wire saw or the like rotating around this reference base to any axis cut so desired. It has been discovered that plates cut such that the 0° Y cut is parallel to the major face of the plate produce a higher frequency transducer which is relatively free of radial mode or shear wave activities.

BRIEF DESCRIPTION OF THE DRAWINGS

These and other features and advantages will become more apparent to those skilled in the art when taken into consideration with the following detailed description wherein like reference numerals indicate like and corresponding parts throughout the several views and wherein.

DETAILED DESCRIPTION OF THE DRAWINGS

Figure 1:
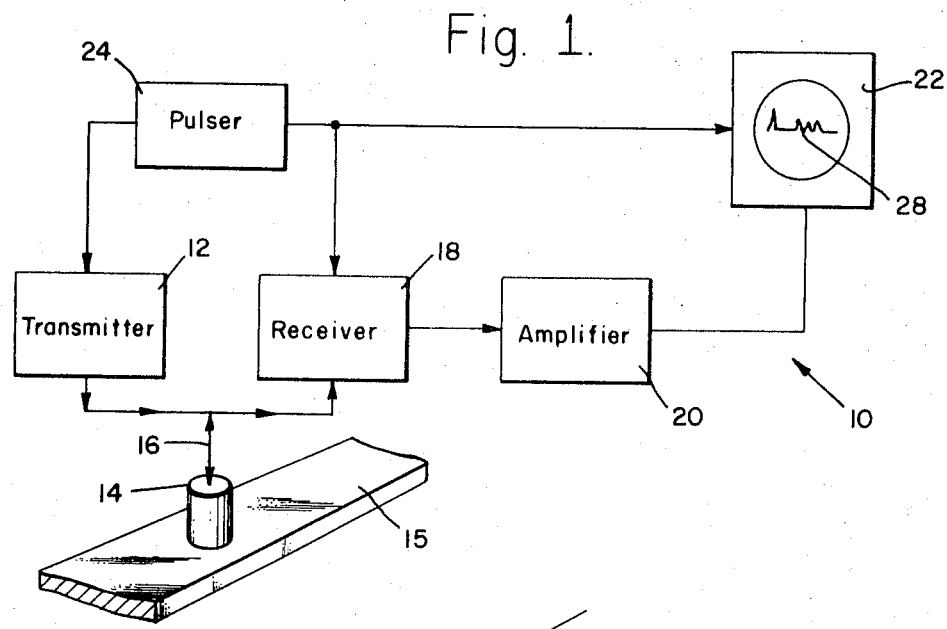
FIG. 1 is a detailed block diagram illustrating the nondestructive test system.

Turning now to a more detailed description of this invention, there is shown as a preferred embodiment herein a nondestructive material tester which is used in accordance with one aspect of the present invention. The embodiment shown in FIG. 1 includes a test instrument 10 which includes a transmitter 12 which is adapted to produce a series of intermittently occuring high voltage, high frequency pulses. The transmitter 12 is coupled to a search unit 14 by a cable 16. The search unit 14 includes an ultrasonic transducer therein. Pulses emitted by the transmitter 12 excite the transducer in the search unit 14 whereby a corresponding pulse of ultrasonic energy is transmitted therefrom into a workpiece 15. Echoes from pulses reflected from the surfaces or a defect within the search unit 14 are received by the transducer in the search unit 14 whereby a similar electrical signal is produced therefrom. This electrical signal is returned by the cable 16 to the receiver 18. The receiver 18 is coupled into vertical deflection plates within a display device 22 which may, for example, be an oscilloscope. The transmitter 12 is driven by pulse generator 24 which also drives horizontal deflection generators disposed within the oscilloscope 22.

The results of the output of the receiver 18 are displayed in the display 28 on the face of the oscilloscope 22. The screen of the oscilloscope 22 reflects the return energy in the form of spikes of the initial pulse. Also shown are spikes indicative of the defects and back reflections from the workpiece 15. Spacing of the spikes is in proportion to the distance between reflections from within the material tested. Any random spike which appears between the initial spacing is indicative of flaws, defects or other discontinuity in the workpiece 15. Thus, the location of these flaws is identifiable by the random spikes between the initial return spikes.

The search unit 14 directs the beam of ultrasonic energy from the transducer contained therein in a preferred direction into the workpiece 15. In some instances, a couplant is positioned between the workpiece 15 and the transducer 14 to provide acoustical coupling therein. In other cases, the workpiece 15 and the transducer 14 are immersed into a tank of liquid couplant such as water to provide the necessary acoustic couplings.

Figure 2:
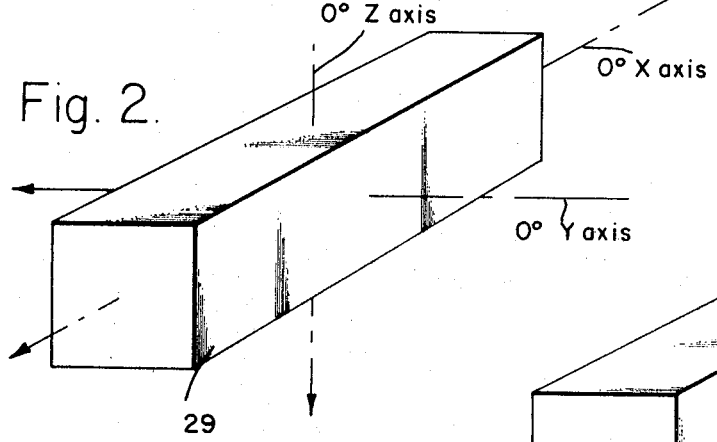
FIG. 2 is a perspective view of a block of crystaline material of lithium niobate.
Figure 3:
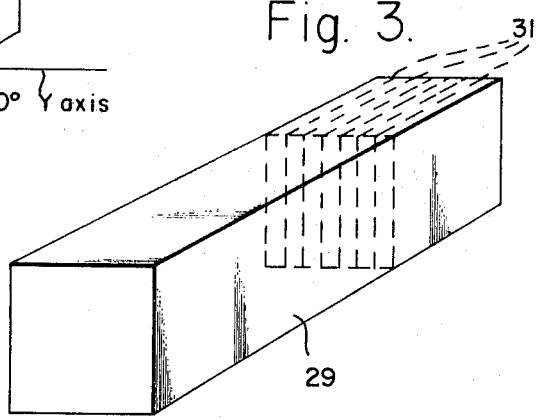
FIG. 3 is the block shown in FIG. 2 and illustrating the desired shape or cut of the plate therefrom.

FIG. 2 illustrates a block of material 29 of lithium niobate which is a piezoelectric material which mechanically deforms when an electrical signal is applied there across and conversely generates an electrical signal when it is mechanically deformed.

The lithium niobate is usually "grown" into a form which is commonly referred to a boule. The lithium niobate in the boule grows as a crystaline structure having three separate and distinct axes. These axes as best seen in FIG. 2 may be identified as the 0° X axis, the 0° Y axis and the 0° Z axis. All three of these axes are substantially orthogonal to each other. By the use of X-ray defraction the axes of the crystaline structure and their orientation may be determined. One means for accomplishing this is described in Chapter 1, 8-4 to 8-23 of "Handbook of Physics," by E. V. Condon, published by McGraw Hill Book Co., New York City, New York.

After the angular orientation of the crystaline structure and its axes have been determined, a reference may be provided on the boule. By way of example, a planar reference face may be cut on the boule substantially normal to the 0° Y axis (as determined by the X-ray defraction). Thus, a series of crystaline plates 31 may be cut from the boule. The opposite sides of the crystaline plate 31 are usually substantially parallel to the reference face on the boule. This will result in the two faces of the plate 31 being substantially normal to the 0° Y axis.

The plates 31 are usually cut with a wire saw. It has been found advantageous to cut the plates while the boule rotates around an axis normal to the reference face and parallel to the 0° Y axis.

If the plates 31 are cut with the major faces on the opposite sides thereof substantially normal to the 0° Y axis, the plate will vibrate at a higher frequency for any given thickness. Moreover, the plate 31 will only vibrate in substantailly a pure tranverse or compression mode. In other words, it will be relatively free of any vibrations in the radial mode of the shear wave mode.

Thus, a plate of lithium niobate crystal cut normal to the 0° Y axis, (i.e., the major faces on the opposite sides of the plate are perpendicular or normal to the 0° Y axis), exhibits a larger frequency constant. Accordingly for any given frequency, the thickness of the crystal plate is considerably greater than the thickness of a similar plate made of the materials used heretofore. (i.e. quartz, lithium sulfate, ceramic materials, etc.)

Since the crystal plate 31 is considerably thicker it is stronger and more rugged for any given frequency. As a consequence, it is possible to produce crystal plates which have higher fundamental operating frequencies.

After a plate 31 has been cut from the boule it may be made into ultrasonic transducers 32 suitable for use in an ultrasonic search unit as described in connection with FIG. 1. The plates 31 may be initially cut to exactly the desired thickness. However, under some circumstances, it may be desirable to cut the plate 31 excessively thick. The opposite faces of the plate 31 may then be lapped, if desired to reduce the thickness of the plate to precisely the desired amount. This insures the faces being very smooth and free from any irregularities (i.e. saw cuts, etc.) which might otherwise interfer with the desired vibrations.

Once the plate 31 is of the desired thickness suitable electrodes 29 and 33 may be applied to the two faces. Normally, this is accomplished by some process such as vapor deposition of a conductive metal in a vacuum chamber. The electrodes 29 and 33 are preferably a highly conductive but very stable material such as gold. Thus the plate 31 and the electrodes 29 and 33 comprise a piezoelectric ultrasonic transducer 32.

Since the lithium niobate plate 31 is a piezo-electric material, by applying an electrical potential to these electrodes 29 and 33 the crystaline structure in the transducer 32 will be mechanically distorted. Conversely, mechanically distorting the crystaline structure will create a potential across the electrodes 29 and 33. By applying an electrical signal of a suitable frequency across the electrodes 29 and 33, the transducer 32 will vibrate and radiate ultrasonic energy from the faces. Conversely, if ultrasonic energy is incident upon at least one of the faces, a correspondent electrical signal will appear across the electrodes 29 and 33. It has been found that because of the unique characteristics of the frequencies of the electrical signals the lithium niobate even through the frequencies of the electrical signals and the ultrasonic energy are in the region of 35 Mhz or higher the crystal plate 31 is still sufficiently thick and strong to be easily handled without cracking, breaking, etc.

Figure 4:
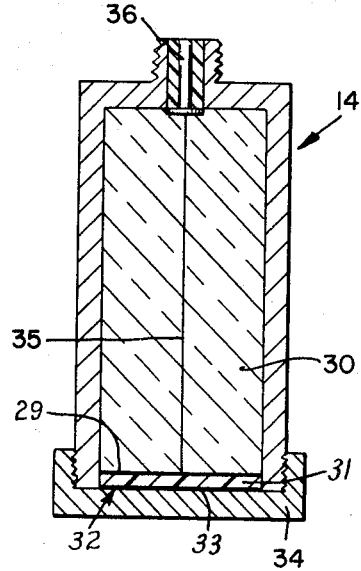
FIG. 4 is a search unit used in a nondestructive material tester which illustrates the positioning of the transducer material cut from the embodiments set forth in FIGS. 2 and 3.

FIG. 4 illustrates the search unit 14 using a lithium niobate transducer 32 produced as described above. The search unit 14 includes a housing of a suitable shape, for example, it is shown cylindrical in this embodiment. The interior of the housing is filled with a suitable acoustical damping material 30.

One side of the transducer 32 is placed in contact with the damping material 30 so as to extend substantially across the end of the search unit 14. The transducer 32 should be in intimate contact with the damping material 30 whereby a suitable dampening action can then be performed thereby. The electrode 29 may be coupled by a lead wire 35 to a contact 36 of an electrical connector at the top of the search unit 14. This coupled to the co-axial cable 16 leading to the system shown in FIG. 1. The other electrode 33 is coupled to ground which in this embodiment may be the housing 14.

An end cap 34 may be positioned across the end of the search unit to cover the transducer 32. This end cap 34 protects the transducer 32 from wear, scratching, etc. However, it should be understood an end cap is not necessary. This is particularly true in view of the fact a transducer 32 of lithium niobate manufactured in accordance with the method herein described is not soluble in a liquid material such as water. Also, it is not sensitive to high temperatures.

Having thus described one preferred embodiment of this invention, what is claimed is:

1. An ultrasonic search unit for use in an ultrasonic nondestructive testing system, said search unit comprising:
   a piezoelectric transducer having a pair of parallel faces,
   said transducer being effective to transmit ultrasonic energy from at least one of said faces in response to an electrical signal applied thereto,
   said transducer being effective to generate an electrical signal in response to ultrasonic energy incident upon one of said faces,
   said transducer including a plate of lithium niobate having said faces normal to the 0° Y axis.

2. The search unit of claim 1 further comprising:
   electrodes disposed on the faces of said plate and effective to apply an electrical signal to said transducer.

3. A search unit for transmitting ultrasonic energy in response to an electrical signal and for producing an electrical signal in response to ultrasonic energy incident thereon, said search unit comprising
   a search unit housing,
   a piezoelectric transducer including a plate of crystalline lithium niobate disposed in said housing and having a pair of parallel faces, said faces being normal to the 0° Y axis of the crystalline structure of the lithium niobate,
   a dampening material disposed in said housing, said dampening material abutting one face of said plate, and
   a pair of electrodes on the faces of said plate.

4. In a nondestructive test system for inspecting a workpiece and having means for generating and transmitting pulses of electrical energy and for receiving electrical signal together with means for utilizing the received signals, the combination of
   an ultrasonic search unit adapted to be acoustically coupled to the workpiece for transmitting ultrasonic energy into the workpiece and receiving ultrasonic energy returned from said workpiece,
   said search unit being coupled to said means and responsive to the pulse of electrical energy therefrom and effective to supply electrical signals thereto,
   a piezoelectric transducer in said search unit, said piezoelectric transducer including a plate of lithium niobate having a pair of parallel faces normal to the 0° Y axis,
   a pair of electrodes on said faces of said plate coupled to said means,
   said transducer being responsive to the pulses of electrical energy from said means and applied to said electrodes for providing corresponding pulses of ultrasonic vibrations from at least one of said faces, said transducer being responsive to ultrasonic vibrations incident on one of said faces for providing corresponding electrical signals across said electrodes.

5. In an ultrasonic nondestructive testing method in which ultrasonic energy is transmitted into a workpiece by a transducer and echoes of ultrasonic energy are received by a transducer from the workpiece, the improvement comprising
   transmitting and/or receiving the ultrasonic energy with a lithium niobate transducer having a major face thereof cut normal to the 0°Y axis and having an electrically conductive electrode thereon.

* * * * *